United States Patent [19]

Kazumoto et al.

[11] Patent Number: 4,922,722
[45] Date of Patent: May 8, 1990

[54] STIRLING REFRIGERATOR WITH NONLINEAR BRAKING SPRING

[75] Inventors: Yoshio Kazumoto; Yoshiro Furuishi; Kazuo Kashiwamura, all of Amagasaki, Japan

[73] Assignee: Mitsubishi Denki Kabushiki Kaisha, Tokyo, Japan

[21] Appl. No.: 330,856

[22] Filed: Mar. 31, 1989

[30] Foreign Application Priority Data

May 24, 1988 [JP] Japan ................ 63-126224

[51] Int. Cl.⁵ .............................................. F25B 9/00
[52] U.S. Cl. ......................................... 62/6; 60/520; 92/85 A; 267/168
[58] Field of Search ................ 62/6; 60/520; 267/166, 267/168; 92/85 R, 85 A

[56] References Cited

U.S. PATENT DOCUMENTS

| | | | |
|---|---|---|---|
| 4,017,062 | 4/1977 | Zwirner | 267/166 |
| 4,077,619 | 3/1978 | Borlinghaus | 267/166 |
| 4,111,407 | 9/1978 | Stager | 267/166 |
| 4,120,489 | 10/1978 | Borlinghaus | 267/166 |
| 4,148,469 | 4/1979 | Geyer | 267/168 |
| 4,514,987 | 5/1985 | Pundak et al. | 62/6 |
| 4,539,818 | 9/1985 | Holland | 62/6 |
| 4,543,792 | 10/1985 | Bertsch | 62/6 |
| 4,642,995 | 2/1987 | Bachler et al. | 62/6 |
| 4,735,403 | 4/1988 | Matsumoto et al. | 267/166 |

*Primary Examiner*—Ronald C. Capossela
*Attorney, Agent, or Firm*—Sughrue, Mion, Zinn, Macpeak & Seas

[57] ABSTRACT

A Stirling refrigerator has a cold-finger in which a displacer can reciprocate in accordance with changes in pressure inside the cold-finger which are produced by a compressor. A spring is connected between the displacer and the cold-finger in order to brake gradually the movement of the displacer at the ends of its stroke. The spring has a greater spring constant when it is deformed by the displacer being near either end of its stroke than when the spring is in, or near, a neutral position.

8 Claims, 5 Drawing Sheets

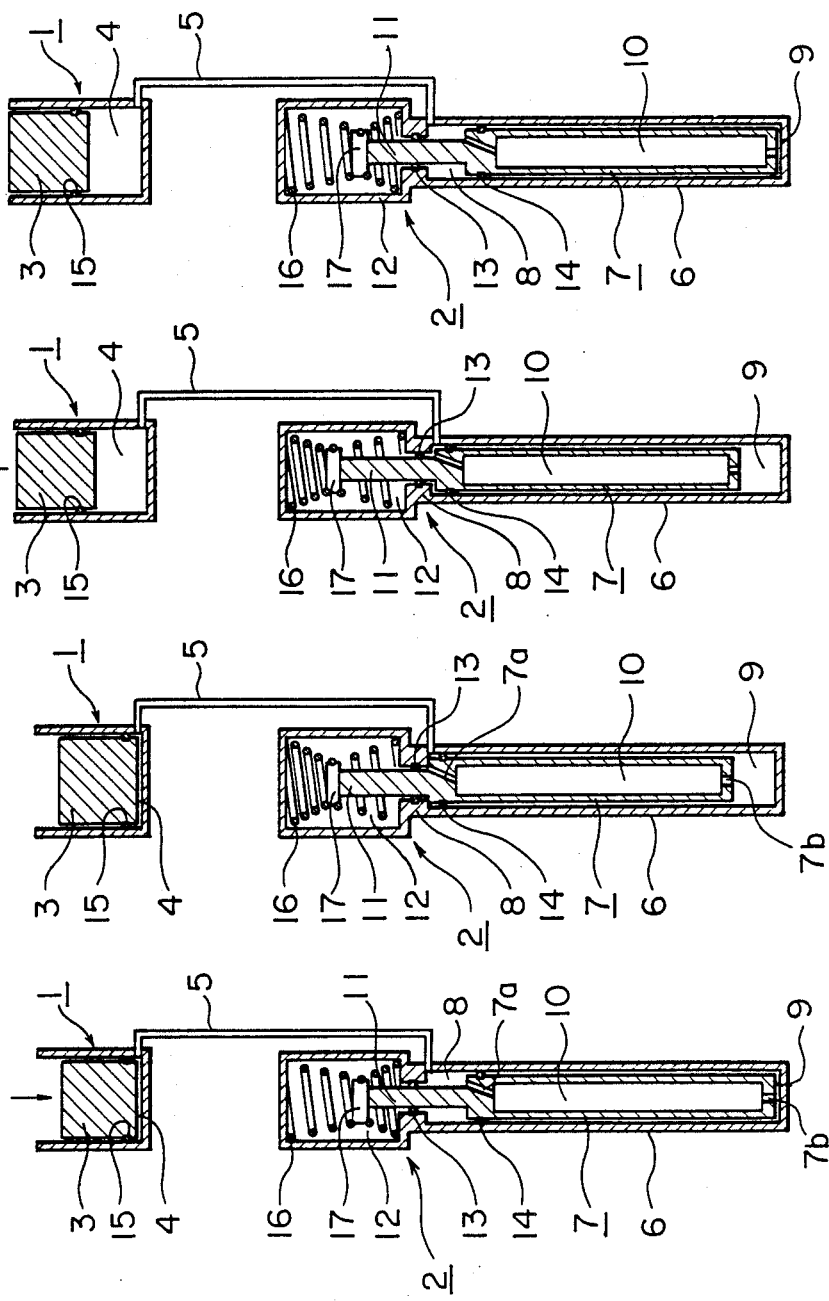

4,922,722

STIRLING REFRIGERATOR WITH NONLINEAR BRAKING SPRING

BACKGROUND OF THE INVENTION

This invention relates to a Stirling refrigerator for cooling the cryoelectronic devices such as infrared detectors or the like. More particularly, it relates to a Stirling refrigerator with a freely-moving displacer.

A Stirling refrigerator of the type to which the present invention pertains has a displacer which is free to reciprocate inside a cold-finger. The cold-finger has a gas spring chamber, and one end of the displacer has a piston element formed thereon which extends into the gas spring chamber. The displacer is made to reciprocate within the cold finger by pressure variations in the cold-finger which are produced by a compressor which is connected to the cold-finger.

In a Stirling refrigerator of this type, the length of the stroke of the displacer as it reciprocates inside the cold-finger is determined by the dimensions of the cold-finger and the gas spring chamber. The displacer travels in one direction until it strikes against the end wall of the inside of the cold-finger, and then it travels in the opposite direction until the piston element which is formed on the displacer strikes against the end wall of the inside of the gas spring chamber. This repeated striking of the displacer and the piston element against the end walls of the cold-finger and the gas spring chamber produces undesirable noise and vibrations. It also produces wear of the displacer and the cold-finger, and results in a decrease in the life span of the refrigerator.

SUMMARY OF THE INVENTION

Accordingly, it is an object of the present invention to provide a Stirling refrigerator which produces less noise and vibration during operation than a conventional Stirling refrigerator.

It is another object of the present invention to provide a Stirling refrigerator which has an increased life span.

A Stirling refrigerator in accordance with the present invention has a displacer which reciprocates inside a cold-finger in response to changes in the pressure within the cold finger which are produced by a compressor. A nonlinear spring is connected between the displacer and the cold finger. The spring has a spring constant which is greater when the spring is deformed such that the displacer is at one of the ends of its stroke than when the spring is in a neutral position. The nonlinear spring brakes the movement of the displacer at the ends of its stroke and prevents the displacer from striking the end walls of the cold finger with force.

In a preferred embodiment, the cold-finger includes a displacer chamber in which the displacer is housed, and a gas spring chamber which adjoins the displacer chamber but is sealed off therefrom. The nonlinear spring can be disposed in any suitable portion of the cold-finger, but in a preferred embodiment, it is housed inside the gas spring chamber.

BRIEF DESCRIPTION OF THE DRAWINGS

FIGS. 1a–1d are vertical cross-sectional views of a first embodiment of a Stirling refrigerator according to the present invention at different stages of operation.

In the drawings, the same reference numerals indicate the same or corresponding parts.

DETAILED DESCRIPTION OF THE PREFERRED EMBODIMENTS

Figure 2A:
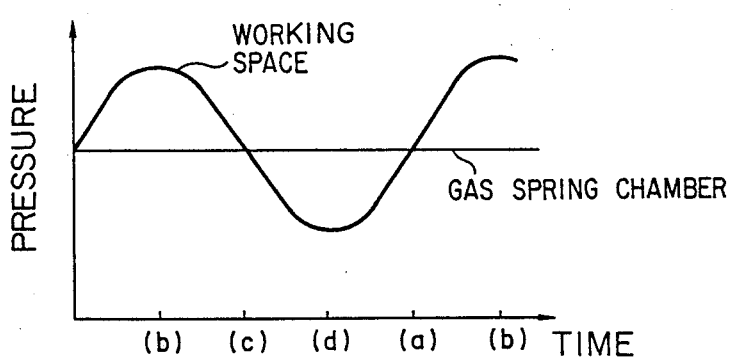
FIG. 2a is a graph of the relationship between the pressure in the working volume and time.

Hereinbelow, a number of preferred embodiments of the present invention will be described while referring to the accompanying drawings, FIG. 1 of which illustrates a first embodiment at four different stages of operation. As shown in FIG. 1, the refrigerator has a compressor 1 in which a piston 3 is slidably disposed. The piston 3 is made to reciprocate within the compressor 1 by an unillustrated crank mechanism which is driven by a motor. As the piston 3 slides up and down, it changes the volume of a second compression chamber 4 in the bottom end of the compressor 1. A working gas such as helium is prevented from leaking from the second compression chamber 4 past the piston 3 by a piston seal 15 which is mounted on the piston 3.

A cold-finger 2 comprises a cylindrical displacer chamber 6 and a gas spring chamber 12 which is integral with the displacer chamber 6. The lower end of the compressor 1 is connected to the upper end of the displacer chamber 6 by a gas supply pipe 5 for helium gas. A cylindrical displacer 7 is slidably disposed inside the displacer chamber 6, and is able to reciprocate up and down therein. A piston element 11 is formed on the upper end of the displacer 7 and extends into the gas spring chamber 12. A piston element seal 13 is mounted on the inside of the displacer chamber 6, and contacts the outer surface of the piston element 11 so as to prevent gas from leaking between the gas spring chamber 12 and the inside of the displacer chamber 6.

A first compression chamber 8 is formed by the space between the upper end of the displacer 7 and the upper end of the displacer chamber 6, while an expansion chamber 9 is formed by the space between the lower end of the displacer 7 and the lower end of the displacer chamber 6.

The inside of the displacer 7 is hollow and contains a heat regenerator 10. The inside of the regenerator 10 communicates with the first compression chamber 8 via a connecting passageway 7a which is formed in the upper end of the displacer 7, and it communicates with the expansion chamber 9 via another connecting passageway 7b which is formed in the bottom of the displacer 7. A displacer seal 14 is mounted on the outside of the displacer 7 to prevent gas from leaking between the first compression chamber 8 and the expansion chamber 9 via the gap between the outer surface of the displacer 7 and the inner surface of the displacer chamber 6.

The second compression chamber 4, the supply pipe 5, the first compression chamber 8, the regenerator 10, and the expansion chamber 9 contain helium gas and constitute a working gas spring chamber 12 which is also filled with helium gas.

This embodiment is further equipped with a nonlinear spring 16 which is housed inside the gas spring chamber 12. The nonlinear spring 16 is in the form of an hourglass-shaped spring. Its upper and lower ends are connected to the end walls of the gas spring chamber 12, and its midportion is connected to the upper end of the piston element 11 by a spring holder 17. The spring 16 has a neutral position in which it exerts no force on the piston element 11. When the spring 16 is in its neutral position, the displacer 7 is located between the extreme ends of the spring 16 stroke. The spring constant of the spring 16 when it is deformed such that the displacer 7 is at either end of its stroke, is greater than the spring constant when the spring 16 is in its neutral position.

Figure 3A:
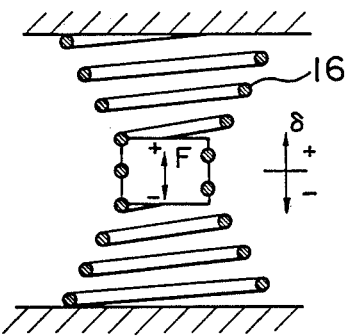
FIG. 3a is a cross-sectional view of a nonlinear spring for use in the present invention and FIG. 3b is a graph of the relationship between the spring force of the nonlinear spring and its deformation δ from a neutral position.
Figure 3B:
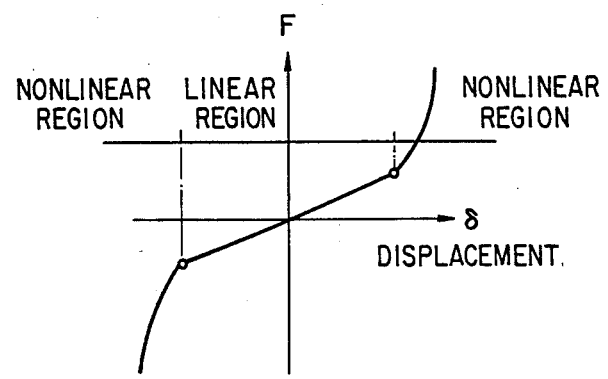

FIG. 3a is a vertical cross-sectional view of the spring 16, and FIG. 3b is a graph of the relationship between the force F exerted by the spring and the displacement $\delta$ of the spring holder 17 from the neutral position of the spring 16. A positive value of F indicates a downward spring force. In a certain region on either side of the neutral position, the spring 16 has linear characteristics, i.e., a constant spring constant, but when the spring 16 is deformed such that the displacer 7 is near one of the ends of its stroke, the spring constant rapidly increases and the characteristics of the spring 16 become nonlinear.

Figure 2B:
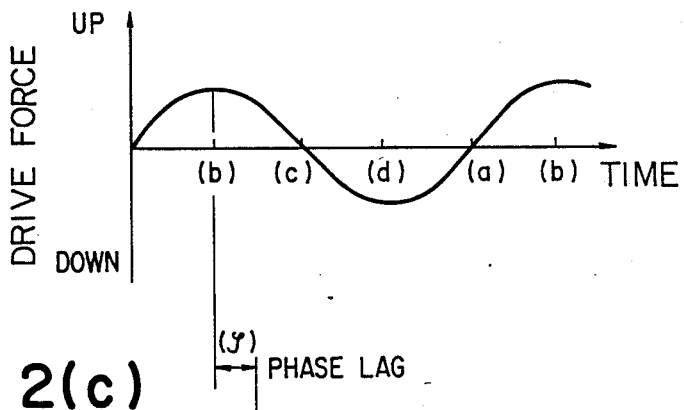
FIG. 2b is a graph of the relationship between drive force and time.
Figure 2C:
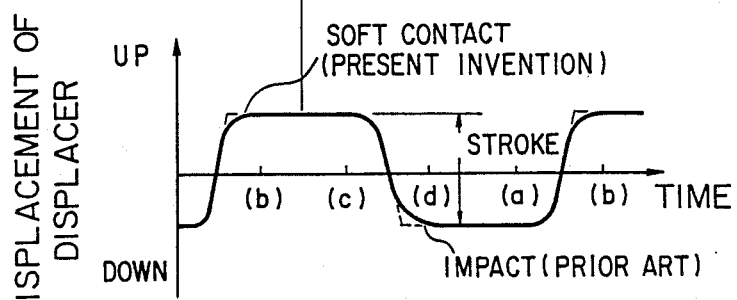
FIG. 2c is a graph of the relationship between the movement of the displacer and time for the embodiment of FIG. 1.

The operation of this embodiment will be described while referring to FIGS. 2a–2c. FIG. 2a is a graph of the pressures in the working space and the gas spring chamber 12 as a function of time, FIG. 2b is a graph of the drive force which acts on the displacer 7 as a function of time, and FIG. 2c is a graph of the vertical displacement of the displacer 7 as a function of time. In FIG. 2, characters (a)–(d) along the X-axes indicate points in time corresponding to FIGS. 1a–1d, respectively.

As the piston 3 is driven up and down inside the compressor 1 by the unillustrated crank mechanism, it performs simple harmonic motion inside the compressor 1, so it produces a sinusoidal variation in the pressure within the working space, as shown in FIG. 2a.

At the point in the cycle corresponding to FIG. 1a, the lower end of the displacer 7 is at the lower end of the displacer chamber 6, and the compressor 1 is compressing the gas within the working space. The compression which is performed by the compressor 1 raises the pressure within the working space from a minimum pressure to a maximum pressure. The pressure within the gas spring chamber 12 is maintained at a stable level approximately midway between the minimum and maximum pressure levels within the working space. At some point during compression, the difference across the piston element 11 between the pressure within the working space, and the pressure within the gas spring chamber 12 is large enough to overcome the frictional resistance produced by the piston element seal 13 and the displacer seal 14. At this point, the pressure difference causes the displacer 7 to rapidly rise to the top end of its stroke, as shown in FIG. 1b. As the displacer 7 moves upwards, high-pressure helium gas which is at approximately ambient temperature is forced from the first compression chamber 8 through the regenerator 10 and into the expansion chamber 9. As the gas passes through the regenerator 10, it is cooled. The piston 3 is then moved upwards within the compressor 1, and the volumes of the second compression chamber 4 and the working space expand. Due to the increase in the volume of the working space, high-pressure helium gas inside the expansion chamber 9 is further cooled. The cooling which occurs in the expansion chamber 9 results in a temperature gradient over the length of the regenerator 10 of over 200K. When the piston 3 moves upwards and increases the volume of the working space, the pressure of the working space falls below the pressure within the gas spring chamber 12. At some point, the pressure differential acting across the piston element 11 is large enough to overcome the frictional resistance generated by the seals, and the displacer 7 moves downwards to the position shown in FIG. 1d in which it is at the bottom of its stroke. The downward movement of the displacer 7 forces the cooled gas within the expansion chamber 9 to flow into the first compression chamber 8 via the regenerator 10, in the process of which it absorbs heat from the regenerator 10 and rises to approximately ambient temperature. The position shown in FIG. 1d is a starting position which proceeds the position of FIG. 1a. The above-described sequence is continually repeated, and the lower end of the cold finger 2 absorbs heat from its surroundings to produce a cooling effect.

As shown in FIG. 2a, the pressure within the working space varies sinusoidally with time, and the pressure within the gas spring chamber 12 remains substantially constant at a level approximately equal to the average pressure within the working space. Therefore, the drive force acting on the displacer 7 also varies sinusoidally, and is equal to the difference between the pressure within the working space and the pressure within the gas spring chamber 12 multiplied by the cross-sectional area of the piston element 11. The displacer 7 and the spring 16 constitute a damped oscillating system which is driven by the sinusoidal drive force. Therefore, the displacer 7 performs oscillation with a phase lag with respect to the drive force.

The spring 16 exerts a braking force on the displacer 7. Since the spring 16 has the nonlinear characteristics shown in FIG. 3b, a much larger braking force is exerted on the displacer 7 near the ends of its stroke than near the neutral position. The spring 16 therefore acts as a shock absorber to absorb the kinetic energy of the displacer 7, and prevents the lower end of the displacer 7 or the upper end of the piston element 11 from strongly impacting the end walls of the displacer chamber 6 and the gas spring chamber 12, respectively. Instead, the displacer 7 and the piston element 11 gently contact the end walls at the opposite ends of the stroke of the displacer 7.

FIG. 2c shows the displacement of the displacer 7 as a function of time, the dashed line being for a conventional refrigerator without a nonlinear spring, and the solid line being for the present embodiment. As is clear from this figure, in a conventional refrigerator, the displacer 7 is abruptly brought to a halt at the ends of its stroke by striking into one of the inner walls of the cold-finger 2, whereas in the present invention, the displacer 7 comes to a gradual stop.

As a result, noise and vibrations due to impact of the displacer 7 can be reduced. In addition, since there is no strong impact of the displacer 7 against the inside of the cold-finger 2, the displacer 7 and the cold-finger 2 undergo less wear and have a longer life span.

Figure 4:
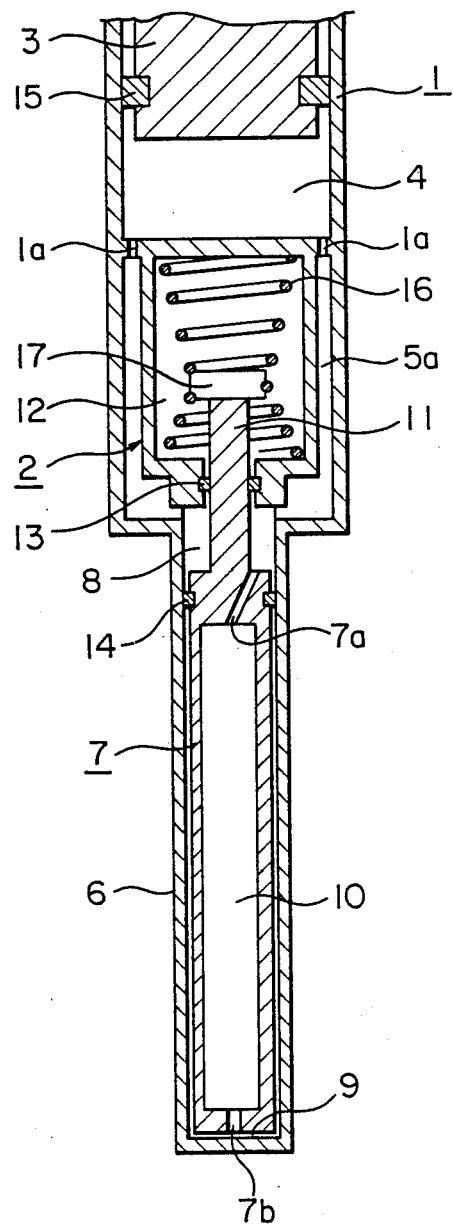
FIG. 4 is a vertical cross-sectional view of a portion of a second embodiment of the present invention.

FIG. 4 illustrates a second embodiment of the present invention which differs from the previous embodiment only in that the compressor 1 is integral with the cold finger 2 instead of being a separate member. The displacer chamber 6 of the cold-finger 2 surrounds the gas spring chamber 12, and is integral with the outer wall of the compressor 1. The second compression chamber 4 communicates with the first compression chamber 8 through holes 1a formed in the bottom surface of the compressor 1, and an annular passageway 5a which surrounds the gas spring chamber 12. The operation of this embodiment is identical to that of the previous embodiment and provides the same benefits.

Figure 5A:
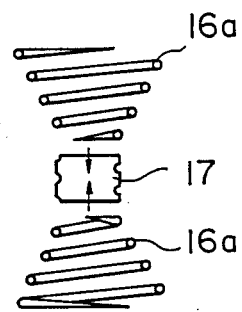
FIGS. 5a–5c are cross-sectional views of other types of nonlinear springs which can be employed in the present invention.
Figure 5B:
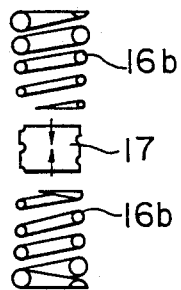
Figure 5C:
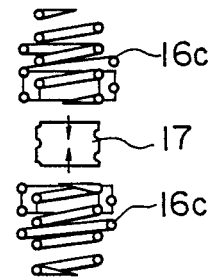

The nonlinear spring which is employed in the present invention for braking the movement of the displacer 7 need not be an hourglass-shaped spring. FIG. 5 shows various examples of other types of nonlinear springs which can be employed in the present invention. FIG. 5a shows a pair of conical springs 16a whose confronting ends are secured to a spring holder 17. FIG. 5b shows a pair of helical springs 16b each made of wire having a varying gauge. The confronting ends of the springs 16b are secured to a spring holder 17. FIG. 5c shows two pairs of double-coil springs 16c whose confronting ends are secured to a spring holder 17.

In the illustrated embodiments, the nonlinear spring 16 is disposed inside the gas spring chamber 12. However, it is also possible to dispose a nonlinear spring inside the first compression chamber 8, or the expansion chamber 9, and to connect it to the displacer 7 and the inside of the cold finger 2 with the same benefits as in the illustrated embodiments.

What is claimed is:

1. A Stirling refrigerator comprising:
   a cold-finger which contains a working gas and includes a displacer chamber and a gas spring chamber which is sealed off from said displacer chamber;
   a displacer which is disposed slidably inside said displacer chamber so as to be able to reciprocate therein and perform a stroke and which divides said displacer chamber into a compression chamber and an expansion chamber, said displacer having a piston element formed thereon which extends into said gas spring chamber;
   a compressor which is connected to said compression chamber and periodically varies the pressure of the working gas inside said compression chamber; and
   a spring which is connected between said displacer and said cold-finger so as to be deformed as said displacer reciprocates within said cold-finger, said spring having a neutral position which it assumes when said displacer is between the ends of its stroke, a spring constant of said spring being constant within a predetermined displacement from said neutral position, and increasing outside said predetermined displacement, the spring constant of said spring being greater when said displacer is near either end of its stroke than when said spring is in its neutral position.

2. A refrigerator as claimed in claim 1, wherein said spring is disposed inside said gas spring chamber, said refrigerator further comprising a spring holder, attached to said spring and to said piston element of said displacer, for transmitting restoring force of said spring to said displacer.

3. A refrigerator as claimed in claim 2, wherein said spring surrounds said piston element.

4. A refrigerator as claimed in claim 1, wherein said spring is disposed inside said displacer chamber.

5. A refrigerator as claimed in claim 1, wherein said spring behaves in a linear manner in the vicinity of its neutral position and which behaves in a nonlinear manner when said displacer is near either end of its stroke.

6. A refrigerator as claimed in claim 1, wherein said spring is an hourglass-shaped spring.

7. A refrigerator as claimed in claim 1, wherein said spring is a double-coil spring.

8. A refrigerator as claimed in claim 1, wherein said spring is a helical spring made from wire whose gauge varies over the length thereof.

* * * * *